Patented Dec. 13, 1932

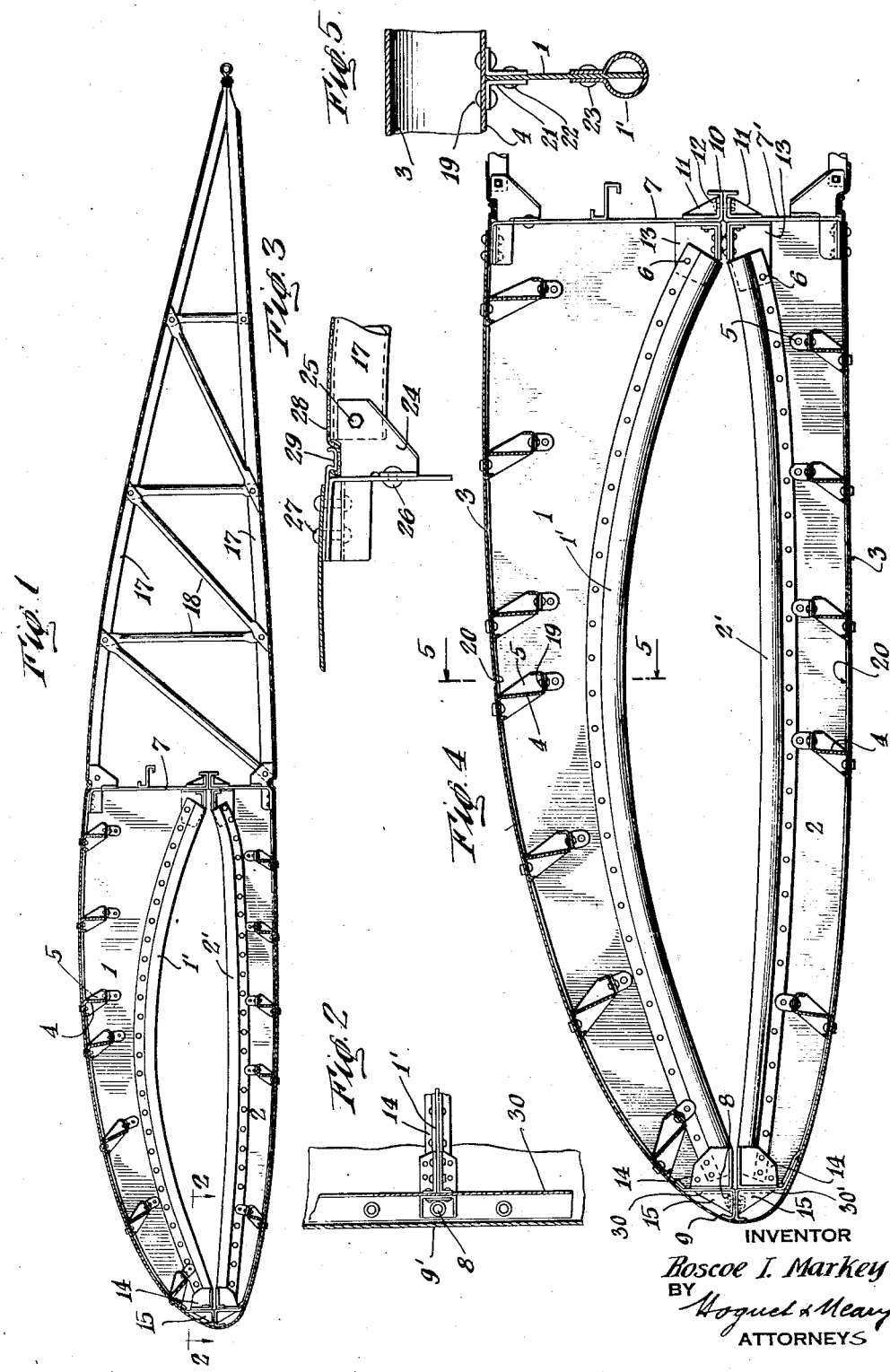

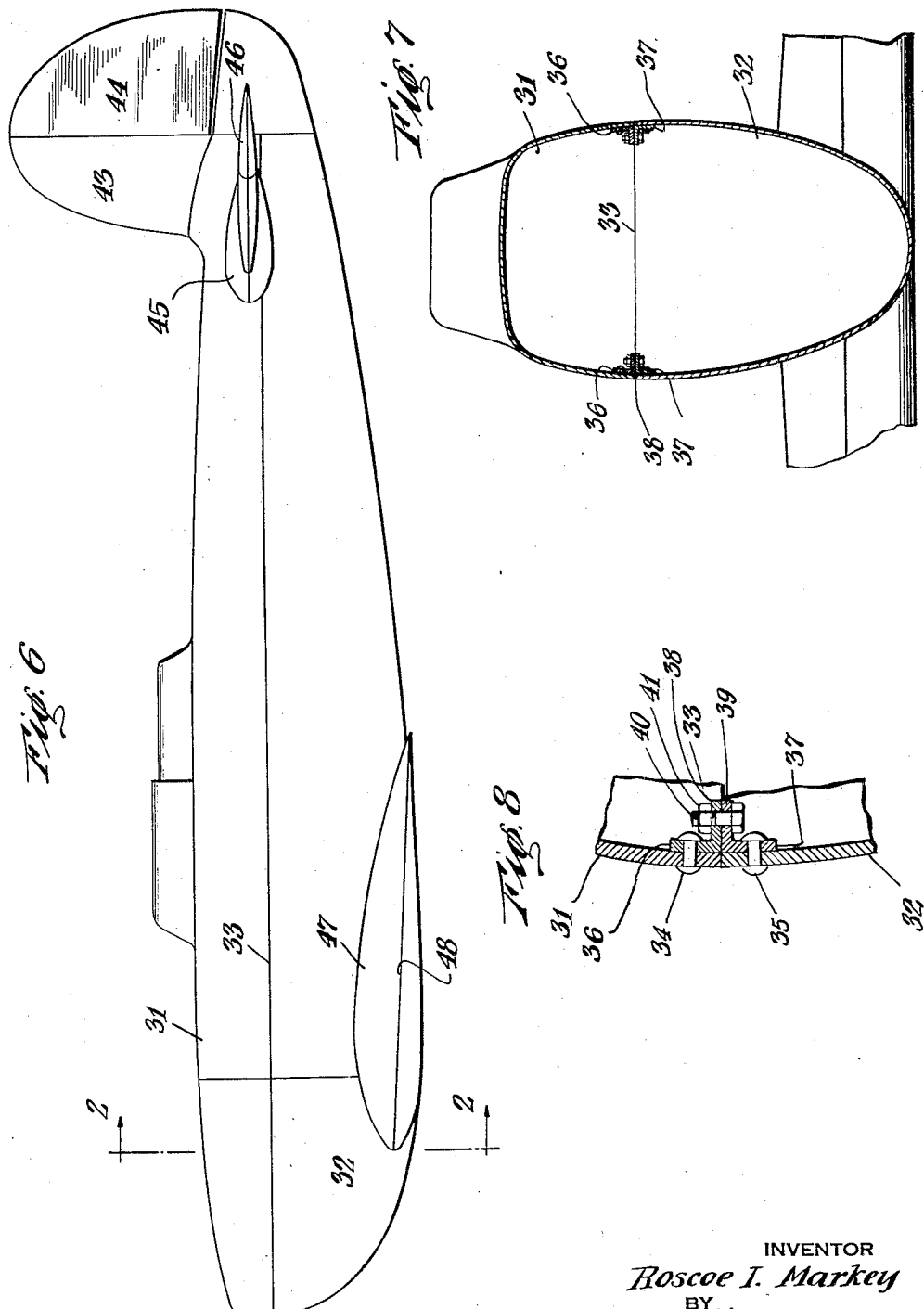

1,890,820

UNITED STATES PATENT OFFICE

ROSCOE I. MARKEY, OF NASSAU COUNTY, NEW YORK, ASSIGNOR TO THE AVIATION PATENT AND RESEARCH CORPORATION, OF NEW YORK, N. Y., A CORPORATION OF NEW YORK

AIRPLANE

Application filed December 9, 1931. Serial No. 579,869.

This invention relates to airplanes, and has for its object to provide an airplane having composite wings, fuselage and tail surfaces, any or all of which are formed of two longitudinal parts, each of which parts may be separately and independently built and assembled, and subsequently releasably connected to each other to form each of these composite structures in order more particularly to gain access to both sides of the covering skin during the riveting process.

Another object of the invention is to provide a wing of this character wherein the upper and lower halves of the wing may constitute the forward part of the wing and that part which will be subjected to the major stresses and against which the durability of construction will provide, and further to provide for a releasably connected rear wing portion of lighter construction and bracing devices.

A further object is to so provide the upper and lower front wing portions that the composite wing may be disassembled without first removing the entire wing from its connection to the fuselage or to either the upper or lower part thereof, if it is of composite structure.

A still further object of the invention is to provide an improved inner bracing system and releasable connections and streamlining devices for bringing about the assembly and disassembly of the composite wing with the minimum difficulty.

With the foregoing and other objects in view, the invention consists in the combination of parts and details of construction, hereinafter set forth in the following description and appended claims, certain embodiments thereof being illustrated in the accompanying drawings, in which:

Figure 1 is a view in longitudinal section taken through the wing.

Figure 2 is a view in section taken along line 2—2 of Figure 1.

Figure 3 is a detail view of the connection between the fore and aft sections of the wing.

Figure 4 is an enlarged view similar to Figure 1 of the front section of the wing.

Figure 5 is a view in section taken along line 5—5 of Figure 4.

Figure 6 is a side elevation of the airplane.

Figure 7 is a view in vertical section of the fuselage showing the wings in front elevation.

Figure 8 is an enlarged detailed view in section through a portion of the fuselage showing the connection of the upper fuselage section to the lower.

Referring more particularly to the drawings, Figure 1, which is a view in section of the composite wing, shows the upper and lower parts of the front section and the unitary rear section of the wing in assembled position by means of a longitudinal connecting seam. The upper and lower front wing halves are provided with interior bracing in the form of arcuate metallic ribs, those of the upper section being indicated at 1 and those of the lower at 2, which are detachably secured to each other and to the rear section of the wing. The upper and lower halves separately and independently assembled and subsequently joined together, each half comprising, in addition to the ribs, a metallic cover or skin 3, a plurality of spars, such as a series of "Z" stringers 4, arranged in apertures 5 in the ribs, the stringers being connected to the ribs at 19 and to the covering 3. The ribs 1 and 2 are attached by their flange 20 to the cover 3 of the upper and lower halves respectively. After each part 1 and 2 have been assembled separately, they are secured to each other by means of their rear flanges 7 and 7' which form the rear extremity of the front section and the base for attachment of the rear wing section. The upper and lower halves have their leading edges secured together at 8 and the fairing piece 9 is then applied to complete the metallic front wing section, which is of relatively small area immediately surrounding the leading edge, and which conforms with the contour of cover 3 but is removable for purposes of allowing ready disassembly of the wing halves from each other.

The rear wing section may comprise any suitable truss work of light material and be covered with a fabric or wooden or metal skin, the aspect ratio being previously so determined that the front metallic wing section is subjected to the greater part of the aerodynamic stresses and strains, leaving the weaker and lighter rear section to complete the streamline of the forward strong section. The rear flanges 7 and 7' may be disassembled, they being flanged at 10 and bolted to brackets 11 at 12, while the rear ends of the reinforced edges 1' and 2' of ribs 1 and 2 are secured at 6 to brackets 13, which in turn are secured to the flange which forms a plate 7, 7'. The front ends of the reinforced edges 1' and 2' of the ribs 1 and 2 are also secured to brackets 14 which are secured to brackets 15 which are bolted together at 8. Brackets 15 are secured to the forward webs 30 and 30'. The nose section 9 of the outer skin 3 is, as said before, preferably made detachable from the remainder of the outer skin so as to allow its removal and subsequent inspection and disassembling of the fastening devices holding the upper and lower wing sections together.

The wing is thus built from front to rear for strength where strength is needed and for lightness where strength is not so material, may also be similarly arranged from the inner part of the wing to its outer tip, as far as lightness and strength are concerned, by providing tapered wing spars, or by other expedients to provide for strength and reinforcement near the inner end where it is needed and for lightness near and at the outer tip.

The actual means of attachment of the stringers to the ribs may take the form of a bracket 21 riveted at 19 to the stringers and to the rib at 22. The reinforcing bead 1' for the rib may be riveted at 23 to the rib.

The rear wing section may be braced by upper and lower ribs 17 with rib braces 18 extending therebetween. The rear wing section may be connected to the front section by means of bolting the ribs 17 at 25 to a bracket 24 carried by the front section, the bracket being riveted at 26 to the rear web flanges 7 and 7' and to the outer front section skin at 27. The skin 28 of the rear wing section may, by any suitable means generally indicated at 29, be secured to the skin of the front section so as to present a general continuity in streamline effect.

Although the preferred form of the invention is shown in the drawings, it may be found desirable to form a composite wing of separately formed upper and lower wing halves extending from the leading to the trailing edge instead of providing for front and rear wing sections, as shown. Furthermore, it may be found desirable to construct the rear section in accordance with the general scheme of construction and assembly of the front wing section.

Figure 6 is a diagrammatic showing of a fuselage built along similar general principles as the wing. As before stated, one of the essential advantages of this split type of construction is the fact that access may be had to both sides of the skin during the riveting or other fastening process. There is always some part of the conventional fuselage where such access cannot be had, whether the entire fuselage is large or small. The present airplane therefore is so constructed that the fuselage, wings, horizontal stabilizer, ailerons and elevators are of split or composite structure and the upper and lower parts are connected along longitudinal seams, while the vertical fin and rudder are also of composite structure, the two parts being built separately and joined together by a vertical seam.

The important feature of the invention is the provision of an airplane having a composite wing and the novel mechanical expedients employed whereby the upper and lower wing halves may be built and assembled as separate units as well as a composite fuselage and sustaining and control surfaces of the same general character. The effect of this design is to allow for what amounts to interior as well as exterior access to the wing, the fuselage, and the other sustaining and control surfaces during the riveting and welding processes necessary to effect the proper connection of the ribs, beads, stringers and skins. Furthermore the manner of assembly of the separate upper and lower wing halves makes for ready disassembly, inspection and replacement or repair of parts thereof without the necessity of removal of the wing skin. Obviously the composite wing may be used in connection with the ordinary type of fuselage and other sustaining and control surfaces without redesign of the wing.

The fuselage as shown in Figure 6 is comprised of upper and lower parts 31 and 32 joined together along the longitudinal seam 33. The joining of these two fuselage parts may be accomplished in a number of different ways, such as is shown in Figure 8, in which the parts 31 and 32 have riveted at 34 and 35 to brackets 36 and 37 respectively extending around the fuselage. The flanges 38 and 39 of brackets 36 and 37 may be secured by suitable means, such as bolts and nuts 40 and 41.

The vertical fin 43 and the rudder may either or both be of split construction, the two parts of each being joined along a vertical seam. The horizontal stabilizer 45 and the elevator 46 may either or both be of split construction, the two parts of each being joined along a longitudinal seam. The wing 47 may be of the type shown in Figure 1 or may be of split construction throughout its two parts, being releasably secured together along the longitudinal seam 48.

I claim:
1. An aerofoil of composite structure comprising separately and independently formed upper and lower parts to form a front wing section, a rear wing section detachably secured to said front section, said upper and lower parts being braced by means of ribs releasably secured to each other at the leading edge of the wing, a partition plate comprised of flanges on the rear end of the ribs of the front wing section, said ribs being releasably connected to each other at said plate, and said rear wing section being connected to said plate.

2. An aerofoil of composite structure having the front section thereof comprising separately and independently formed upper and lower parts each of which is braced by means of metallic ribs, the wing parts being releasably secured to each other by means of connections between the corresponding aligned ribs at their leading edges and also at their rear edges to form a partition plate comprised of web flanges, a metallic skin arranged about the assembled wing parts, the leading edge of which skin is releasably connected to the remainder thereof, a rear wing section releasably connected to said plate constituting the rear extremity of the front section, said rear wing section being provided with its own bracing system and skin constructed and assembled independently of said front section.

3. An aerofoil of composite structure, comprising separately and independently formed upper and lower parts to form a front wing section, a rear wing section detachably secured to said front section, said upper and lower part being braced respectively by means of spaced upper and lower ribs of wing form outer peripheries and releasably secured to each other at the leading edge of the wing, said ribs also converging at their rear extremities and releasably secured to each other by means of connecting elements integrally with said ribs forming a plate to which said rear wing section is connected.

4. An aerofoil of composite structure, comprising separately and independently formed upper and lower parts to form a front wing section, a rear wing section detachably secured to said front section, said upper and lower part being braced respectively by means of spaced upper and lower ribs of wing form outer peripheries and releasably secured to each other at the leading edge of the wing, said ribs also converging at their rear extremities and releasably secured to each other by means of connecting elements integrally with said ribs forming a plate to which said rear wing section is connected, the lower part of said front wing section being detachable and releasable with the remainder of said aerofoil intact on said aerofoil.

5. An aerofoil of composite structure, comprising separately and independently formed upper and lower parts to form a front wing section, a rear wing section detachably secured to said front section, said upper and lower part being braced respectively by means of spaced upper and lower ribs of wing form outer peripheries and releasably secured to each other at the leading edge of the wing, said ribs also converging at their rear extremities and releasably secured to each other by means of connecting elements integrally with said ribs forming a plate to which said rear wing section is connected, said rear wing section being provided with its own bracing system and assembled independently of said front section.

6. An aerofoil of composite structure, comprising separately and independently formed upper and lower parts to form a front wing section, a rear wing section detachably secured to said front section, said upper and lower part being braced respectively by means of spaced upper and lower ribs of wing form outer peripheries and releasably secured to each other at the leading edge of the wing, said ribs also converging at their rear extremities and releasably secured to each other by means of connecting elements integrally with said ribs forming a plate to which said rear wing section is connected, said ribs each being provided with apertures in which are located stringers connecting said ribs to the skin of said aerofoil.

7. An aerofoil of composite structure, comprising separately and independently formed upper and lower parts to form a front wing section, a rear wing section detachably secured to said front section, said upper and lower part being braced respectively by means of spaced upper and lower ribs of wing form outer peripheries and releasably secured to each other at the leading edge of the wing, said ribs also converging at their rear extremities and releasably secured to each other by means of connecting elements integrally with said ribs forming a plate to which said rear wing section is connected, a detachable skin section comprising the leading edge of said aerofoil and housing the connection between the leading edges of said ribs.

8. An aerofoil of composite structure, comprising separately and independently formed upper and lower parts to form a front wing section, a rear wing section detachably secured to said front section, said upper and lower part being braced respectively by means of spaced upper and lower ribs of wing form outer peripheries and releasably secured to each other at the leading edge of the wing, said ribs also converging at their rear extremities and releasably secured to each other by means of connecting elements integrally with said ribs forming a plate to which said rear wing section is connected, so as to comprise a composite structure with independently formed parts adapted to be releasably secured along seams corresponding to the plane in which the aerofoil exerts its stabilizing influence.

In testimony whereof, I have signed my name to this specification this 18th day of November, 1931.

ROSCOE I. MARKEY.